(12) United States Patent
Zimmerli

(10) Patent No.: US 8,353,209 B1
(45) Date of Patent: Jan. 15, 2013

(54) RADIO FREQUENCY TANK EIGENMODE SENSOR FOR PROPELLANT QUANTITY GAUGING

(75) Inventor: Gregory A. Zimmerli, Brunswick, OH (US)

(73) Assignee: United States of America as represented by the Administrator of National Aeronautics and Space Administration, Washington, DC (US)

(*) Notice: Subject to any disclaimer, the term of this patent is extended or adjusted under 35 U.S.C. 154(b) by 492 days.

(21) Appl. No.: 12/570,841

(22) Filed: Sep. 30, 2009

(51) Int. Cl.
*G01F 22/00* (2006.01)

(52) U.S. Cl. ............ 73/290 B; 73/290 V; 73/304 R

(58) Field of Classification Search ........... 73/290 B, 73/290 R, 290 V, 291, 304 R
See application file for complete search history.

(56) References Cited

U.S. PATENT DOCUMENTS

| | | | |
|---|---|---|---|
| 3,237,451 A * | 3/1966 | Haeff | 73/149 |
| 3,312,107 A | 4/1967 | Burns et al. | |
| 3,447,374 A * | 6/1969 | Cohn et al. | 73/290 R |
| 3,540,275 A | 11/1970 | Post et al. | |
| 3,569,827 A | 3/1971 | Dryden et al. | |
| 3,988,933 A * | 11/1976 | Fletcher et al. | 73/865 |
| 4,170,135 A | 10/1979 | Booman et al. | |
| 4,495,807 A | 1/1985 | Field et al. | |
| 4,535,627 A * | 8/1985 | Prost et al. | 73/290 B |
| 4,729,245 A | 3/1988 | Hansman, Jr. | |
| 4,740,726 A * | 4/1988 | Umezawa | 310/316.01 |
| 5,092,170 A | 3/1992 | Honstvet et al. | |
| 5,247,832 A * | 9/1993 | Umezawa et al. | 73/290 V |
| 5,251,482 A * | 10/1993 | Bates et al. | 73/290 V |
| 5,407,092 A * | 4/1995 | Hardgrove et al. | 220/590 |
| 5,602,333 A * | 2/1997 | Larrabee et al. | 73/149 |
| 6,218,843 B1 * | 4/2001 | Zimmerman et al. | 324/426 |
| 6,505,509 B2 | 1/2003 | Gualtieri | |
| 6,546,795 B1 * | 4/2003 | Dietz | 73/290 R |
| 7,113,660 B2 * | 9/2006 | Andrews et al. | 385/13 |
| 7,114,384 B1 * | 10/2006 | Bates et al. | 73/149 |
| 7,191,069 B2 | 3/2007 | Wishart et al. | |
| 7,474,911 B2 | 1/2009 | Ya'akov et al. | |
| 8,066,343 B2 * | 11/2011 | Nishihara | 347/7 |
| 2004/0149030 A1 * | 8/2004 | Heilig | 73/290 V |
| 2006/0007253 A1 * | 1/2006 | Kosugi | 347/7 |
| 2006/0042386 A1 * | 3/2006 | Young et al. | 73/579 |
| 2010/0218599 A1 * | 9/2010 | Young et al. | 73/290 V |

FOREIGN PATENT DOCUMENTS

JP 55110918 A * 8/1980

OTHER PUBLICATIONS

Zimmerli et al., "Radiofrequency Tank Modes Tested at NASA Glenn to Gauge Liquid Oxygen and Liquid Methane", 2007 Research and Technology Report, NASA Glenn Research Center, Jun. 2008.*

(Continued)

*Primary Examiner* — David Rogers
(74) *Attorney, Agent, or Firm* — Roger D. Emerson; Robert H. Earp, III

(57) ABSTRACT

A method for measuring the quantity of fluid in a tank may include the steps of selecting a match between a measured set of electromagnetic eigenfrequencies and a simulated plurality of sets of electromagnetic eigenfrequencies using a matching algorithm, wherein the match is one simulated set of electromagnetic eigenfrequencies from the simulated plurality of sets of electromagnetic eigenfrequencies, and determining the fill level of the tank based upon the match.

20 Claims, 13 Drawing Sheets

OTHER PUBLICATIONS

Gregory A. Zimmerli, et al., Radio Frequency Mass Gauging of Propellants, report, Aug. 2007, NASA/TM—2007-214907, AIAA-2007-1198, USA.

Jackson, J.D., "Classical Electrodynamics", 2nd ed., John-Wiley & Sons, New York, 1975, Chap. 8.

D. Celik, S.W. Van Sciver, "Dielectric coefficient and density of subcooled liquid oxygen", report, 2005, pp. 356-361, Cryogenics 45, Elsevier Ltd., United States.

James D. Lockhart, "RF Liquid Level Sensing Technique", report, Feb. 28, 1966, pp. 1-131, LMSC-A785006, Lockheed Missiles & Space Company.

The Bendix Corporation Instruments & Life Support Division, "RF Quantity Gauging System", Summary Report, Mar. 23, 1972, pp. 1-13, Pub. No. 4918-72, The Bendix Corporation Instruments & Life Support Division, Davenport, Iowa.

A.J. Bahr and A. Karp, "Study of Zero-G Propellant Gauging Based on Tank Electromagnetic Resonances", Report, Apr. 1975, pp. 1-74, L33569, Stanford Research Institute, Menlo Park, California.

R.S. Collier, D. Ellerbruch, J.E. Cruz, R. W. Stokes, P. E. Luft, R. G. Peterson, A.E. Hiester, "Mass Quantity Gauging by RF Mode Analysis", Interim Report, Feb. 1973, pp. 1-37, NBSIR73-318, Cryogenics Division Institute for Basic Standards National Bureau of Standards, Boulder, Colorado.

G. Goubau, "Electromagnetic Waveguides and Cavities", Report, 1961, pp. 1-4, Section 25, Pergamon Press, London.

Ball Aerospace Systems Group, K. Van Leuven, "Zero-Gravity Quantity Gaging System Bench-Top Tests", engineering report, May 1988, pp. 1-45, Report #ZG-011, Ball Aerospace Systems Group, Boulder, Colorado.

G. Zimmerli, K. Vaden, M. Herlacher, D. Buchanan, N. Vandresar, "Radio Frequency Mass Gauging of Propellants: Applications to Low-Gravity Gauging," 2007 AIAA Aerospace Sciences Meeting, NASA.

* cited by examiner

RADIO FREQUENCY TANK EIGENMODE SENSOR FOR PROPELLANT QUANTITY GAUGING

I. ORIGIN OF THE INVENTION

The invention described herein was made by an employee of the United States Government and may be manufactured and used by or for the Government for Government purposes without the payment of any royalties thereon or therefore.

II. BACKGROUND OF THE INVENTION

A. Field of Invention

This invention relates generally to measuring the quantity of liquid in a storage container and more particularly to gauge the quantity of propellant in a tank.

B. Description of the Related Art

It is well known in the art to measure the amount of liquid in a storage tank. The general concept of measuring the electromagnetic eigenmodes of a tank as a method to gauge the quantity of liquid in a propellant tank dates back to 1966, when Lockheed Missiles and Space Company first tested the technique as a level sensor in tanks partially filled with RP-1, liquid hydrogen, and liquid oxygen.

While known measurement methods perform well for their intended purpose, there are limitations. One limitation is that the configuration of the liquid in the tank at low or partial gravity is uncertain. Another limitation is that the configuration of a liquid, which is sloshing or splashing within the tank at any gravity, is uncertain. Another limitation is the complexity of converting a tank radio frequency (RF) spectrum into a propellant quantity reading. Another limitation is accurately predicting the field modes of the tank.

Therefore, what is needed is a highly accurate RF measurement method and apparatus to gauge the amount of propellant in a tank.

III. SUMMARY

According to one embodiment of this invention, a method for measuring the quantity of fluid in a tank may include the steps of: simulating a plurality of sets of electromagnetic eigenfrequencies of the tank for a range of fill levels using an electromagnetic eigenmode solver algorithm, wherein each simulated set of electromagnetic eigenfrequencies represents a specific fill level within the tank; inputting the simulated plurality of sets of electromagnetic eigenfrequencies into a computer database; transmitting a first range of radio waves using a transmitting device located inside the tank; receiving the first range of radio waves using a receiving device located inside the tank; identifying a measured set of electromagnetic eigenfrequencies in the first range of radio waves using an eigenfrequency identifier algorithm; comparing the measured set of electromagnetic eigenfrequencies to the simulated plurality of sets of electromagnetic eigenfrequencies; selecting a match between the measured set of electromagnetic eigenfrequencies and the simulated plurality of sets of electromagnetic eigenfrequencies using a matching algorithm, wherein the match is one simulated set of electromagnetic eigenfrequencies from the simulated plurality of sets of electromagnetic eigenfrequencies; and determining the fill level of the tank based upon the match. In another embodiment, each simulated set of electromagnetic eigenfrequencies may represent a specific fluid configuration at a specific fill level of the tank, wherein the fluid has at least one configuration at the specific fluid fill level of the tank. The fluid may have at least one configuration at each fluid fill level of the tank. The fluid may have a plurality of different configurations at the specific fluid fill level of the tank. A single antenna may include the transmitting device and the receiving device.

According to another embodiment of this invention, an apparatus for measuring a quantity of fluid may include a tank; a simulator device comprising an eigenmode solver computer algorithm for simulating a plurality of sets of electromagnetic eigenfrequencies of the tank for a range of fill levels, wherein each simulated set of electromagnetic eigenfrequencies represents a specific fill level within the tank; an electronic data storage device for storing the simulated plurality of sets of electromagnetic eigenfrequencies; a transmitter device located inside the tank for transmitting a first range of radio waves; a receiver device located inside the tank for receiving the first range of radio waves; an identifier device comprising an eigenfrequency identifier computer algorithm for identifying a measured set of electromagnetic eigenfrequencies in the first range of radio waves; a comparer device for comparing the measured set of electromagnetic eigenfrequencies to the simulated plurality of sets of electromagnetic eigenfrequencies; a selector device for selecting a match between the measured set of electromagnetic eigenfrequencies and the simulated plurality of sets of electromagnetic eigenfrequencies using a matching computer algorithm, wherein the match is one simulated set from the simulated plurality of sets of electromagnetic eigenfrequencies; and a determiner device for determining the fill level of the tank based upon the match. In another embodiment, each simulated set of electromagnetic eigenfrequencies may represent a specific fluid configuration at a specific fill level of the tank, wherein the fluid has at least one configuration at the specific fluid fill level of the tank. The fluid may have at least one configuration at each fluid fill level of the tank. The fluid may have a plurality of different configurations at the specific fluid fill level of the tank.

One advantage of this invention is that the liquid in the tank does not have to be settled first before taking a quantity measurement.

Another advantage of this invention is that no calibration of the quantity measurement is required.

Still other benefits and advantages of the invention will become apparent to those skilled in the art to which it pertains upon a reading and understanding of the following detailed specification.

IV. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

Figure 10A:
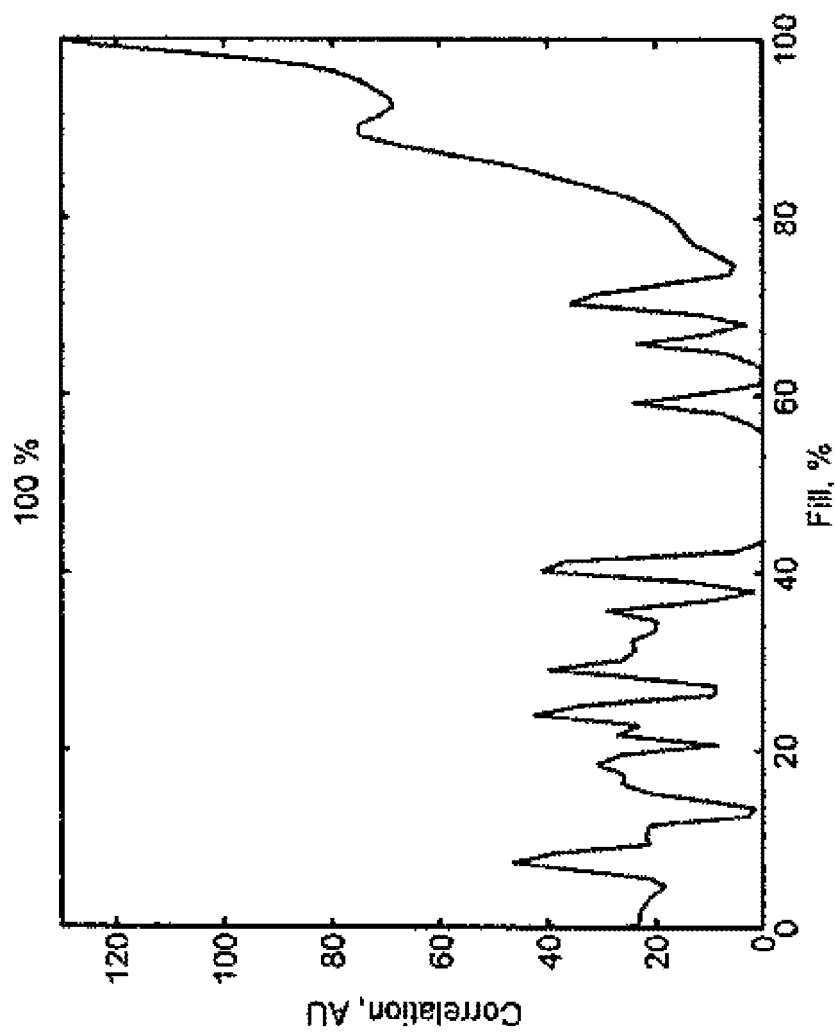

FIG. 10*a* is a graph of the output from the correlation function as a function of fill level, at a fill level of 100%.

Figure 10B:
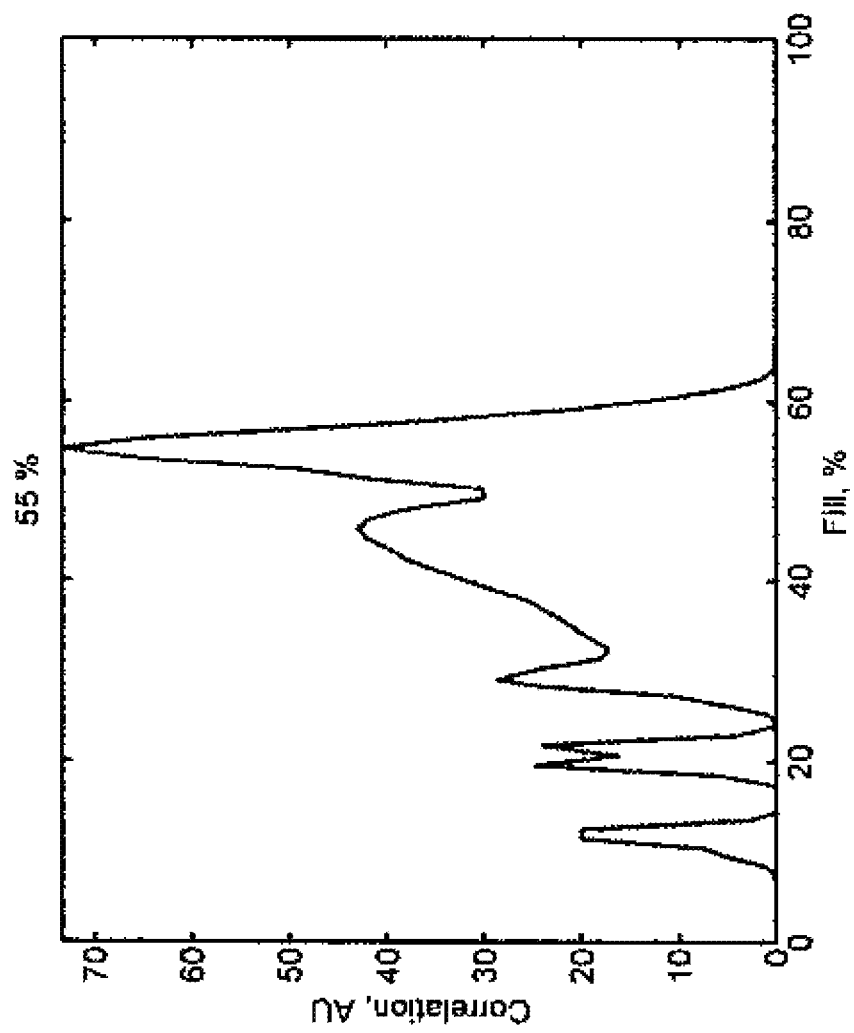

FIG. 10*b* is a graph of the output from the correlation function as a function of fill level, at a fill level of 55%.

Figure 10C:
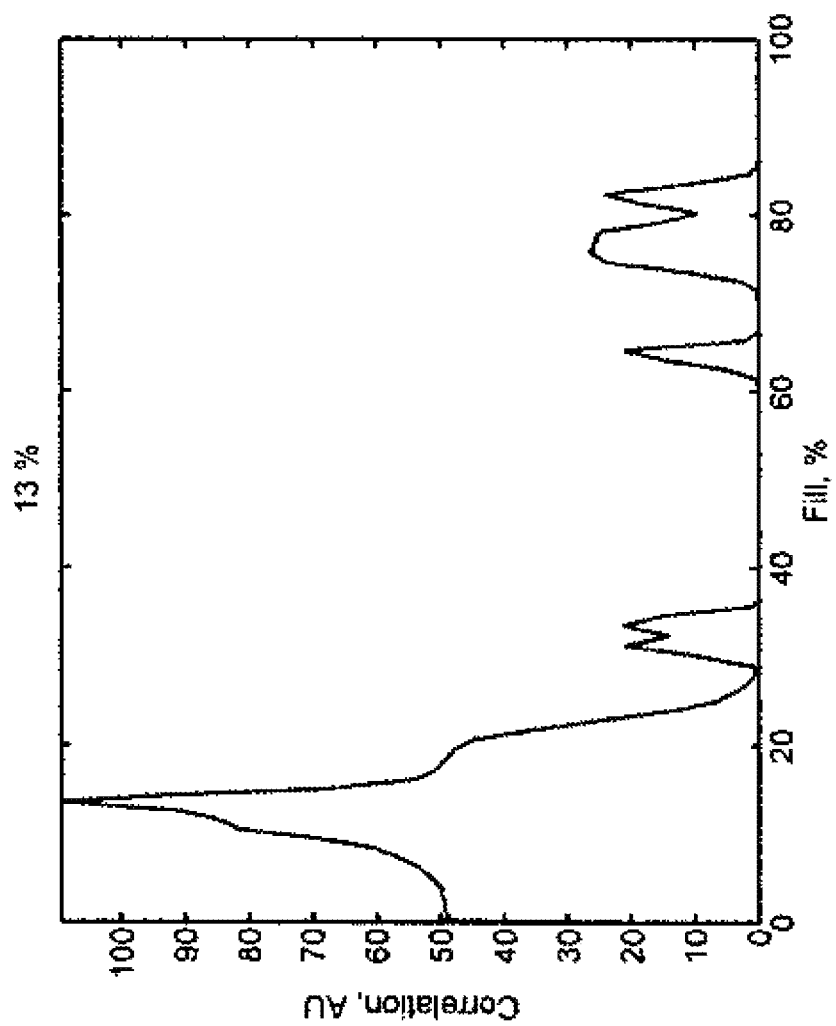

FIG. 10*c* is a graph of the output from the correlation function as a function of fill level, at a fill level of 13%.

Figure 11:
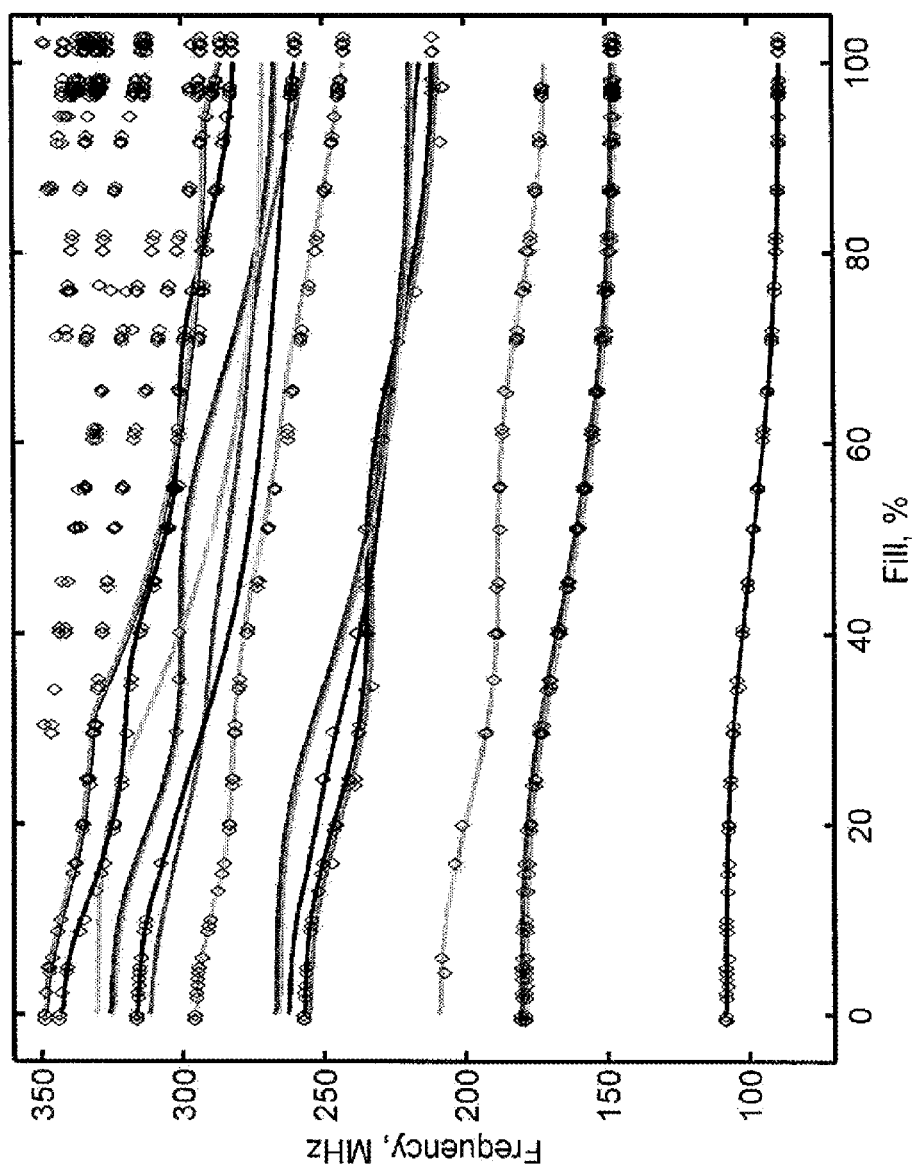

FIG. 11 is a graph of the measured eigenmodes detected by an antenna (symbols) with the computer-simulated eigenmodes (solid lines) as a function of fluid fill level.

V. DETAILED DESCRIPTION

Figure 1:
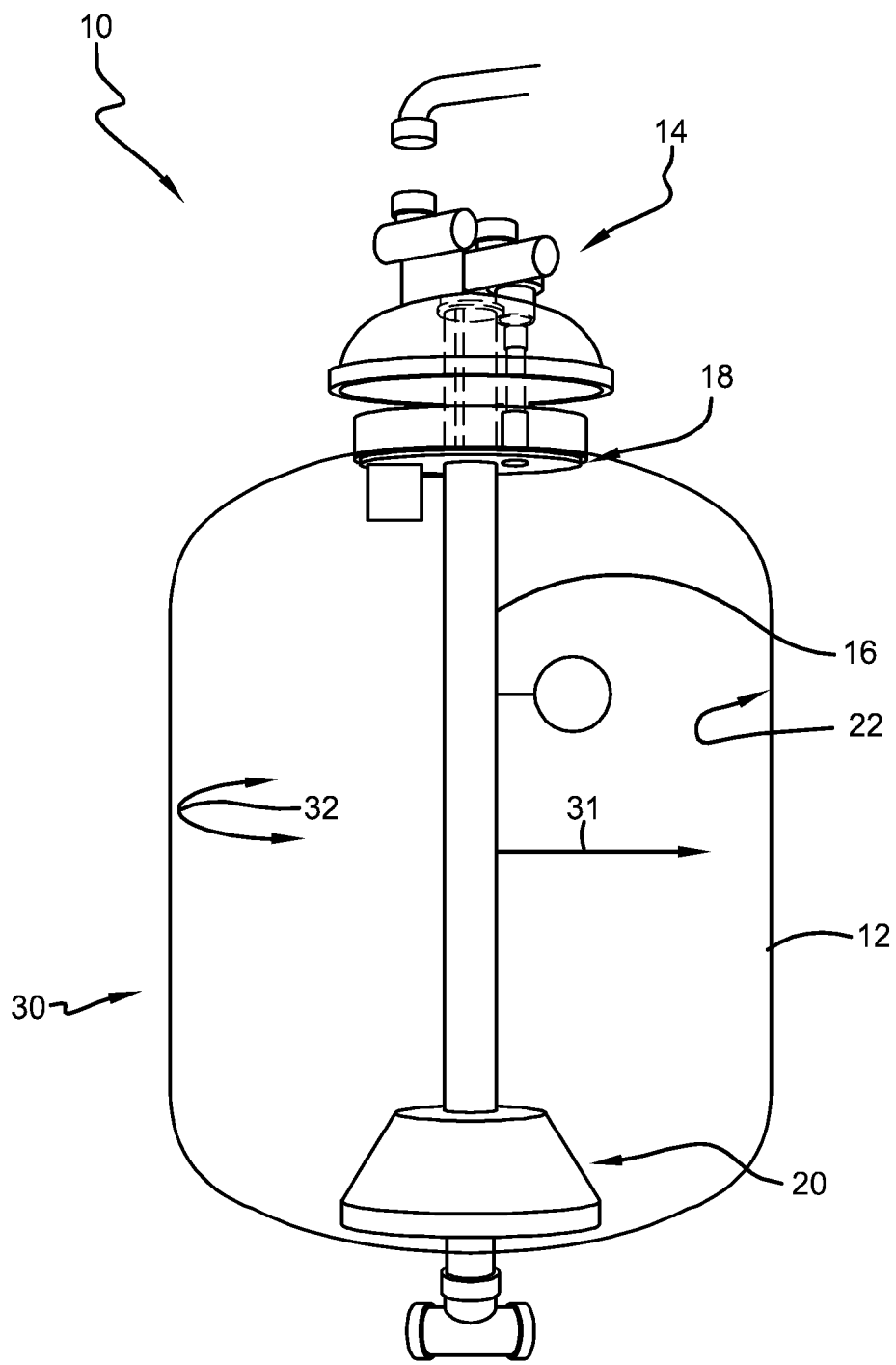
FIG. 1 is a perspective view of a tank.
Figure 2:
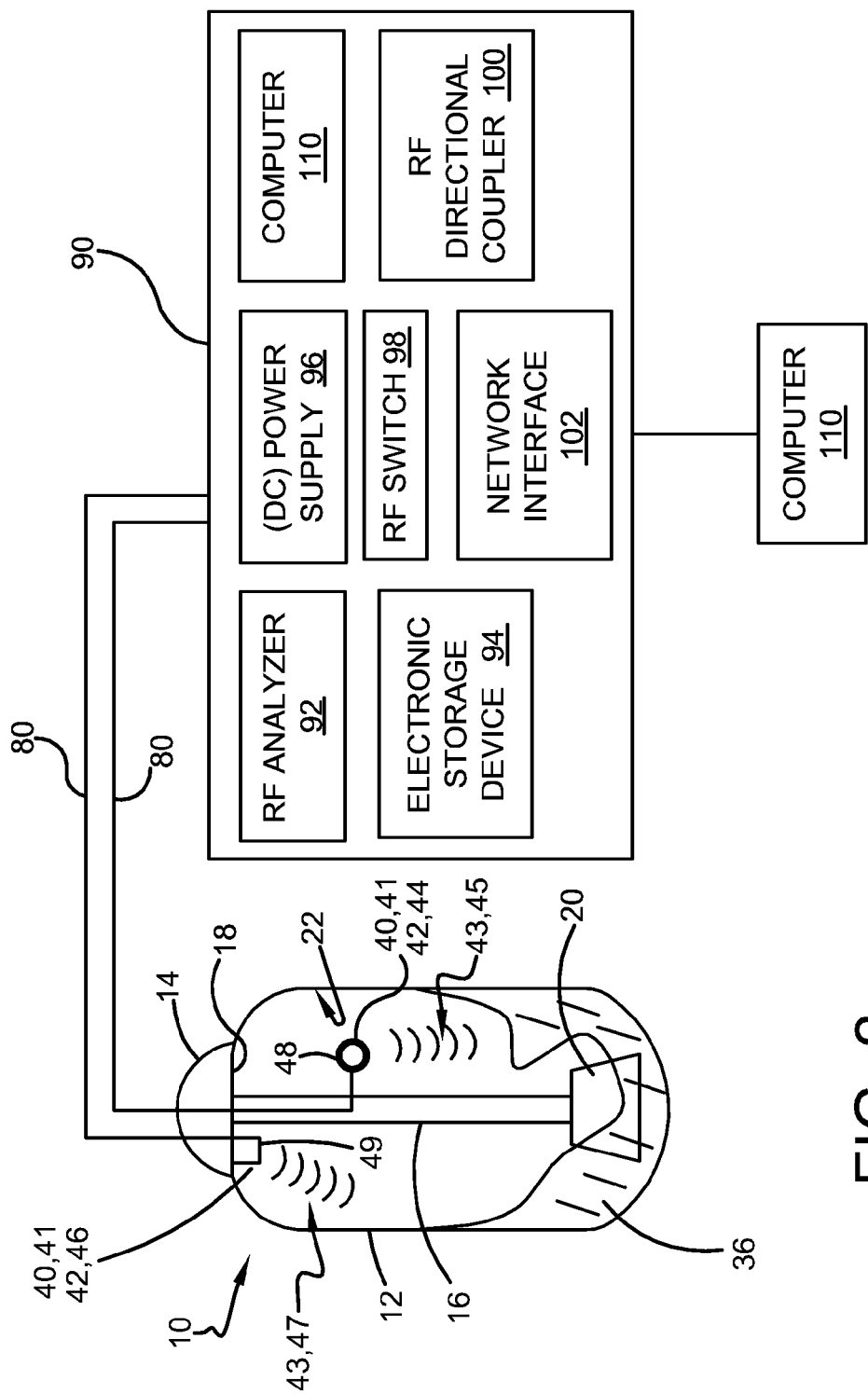
FIG. 2 is a diagram of the tank and a radio frequency measurement system.

Referring to the drawings wherein the showings are for purposes of illustrating embodiments of the invention only and not for purposes of limiting the same, and wherein like reference numerals are understood to refer to like components, FIGS. 1 and 2 show a propellant tank 10 according to one embodiment of this invention. The tank 10 may have any design or shape chosen with ordinary skill in the art. The tank 10 may be located in many various gravity environments including, but not limited to, the Earth's gravity (about 1 g), low gravity (less than or equal to about 0.5 g), the Moon's gravity, or zero gravity. The tank 10 may include walls 12, a lid 14, a central tube 16, a baffle plate 18, a sump 20, and other tank hardware as is well known in the art. The walls 12 may be formed of metal, and in one embodiment, are formed of stainless steel. Alternatively, the walls 12 may be formed of any non-metallic or partially metallic material chosen by one with ordinary skill in the art. In this alternate embodiment, the walls 12 may include an inner liner 22 formed of metal. The walls 12 may also serve to contain the RF energy. The EM wave may penetrate a finite distance into the metal, by a characteristic 1/e length known as the skin depth. The skin depth is $\delta = (2/\mu\sigma\omega)^{1/2}$ where $\sigma$ is the electrical conductivity, $\mu$ is the magnetic permeability, and $\omega = 2\Pi f$ is the angular frequency. For one non-limiting example, type 304 stainless steel has a skin depth of approximately 42 μm at room temperature and at a frequency of about 100 MHz. The tank 10 may include a cylindrical portion 30, which has a radial vector direction 31 and a circumferential vector direction 32. The tank 10 may contain and store dielectric fluid 36. In one embodiment, the tank 10 contains and stores a cryogenic propellant 36 including, but limited to, liquid hydrogen, liquid oxygen, and liquid methane.

With continuing reference to FIGS. 1 and 2, a transmitting device 40 may be located in the interior 38 of the tank 10. The transmitting device 40 may transmit a frequency range of radio waves 43. The transmitting device 40 may be any type of antenna. By antenna, we mean any apparatus for sending and/or receiving electromagnetic waves. The frequency range of radio waves 43 may be any frequency range chosen with ordinary skill in the art. The frequency range of radio waves 43 may have any increment chosen with ordinary skill in the art. The chosen frequency range for the frequency range of radio waves 43 may depend upon the design and/or shape of the tank 10. In one embodiment, the frequency range of radio waves 43 is from about 50 MHz to about 350 MHz in 0.0333 MHz increments. A receiving device 41 may also be located in the interior 38 of the tank 10. The receiving device 41 may receive the frequency range of radio waves 43 transmitted by the transmitting device 40. The receiving device 41 may be any type of antenna. In one embodiment, the transmitting device 40 and the receiving device 41 are the same antenna 42. The antenna 42 may be any type of antenna chosen with ordinary skill in the art including, but not limited to, a dipole antenna, a monopole antenna, a loop antenna, or any other suitable design for exciting and detecting the electromagnetic eigenfrequencies of the tank. The antenna 42 may have any design chosen with ordinary skill in the art. One or more antennas 42 may be located in the interior 38 of the tank 10 at any location chosen by one with ordinary skill in the art. Only one antenna 42 is needed to perform a radio frequency mass gauge (RFMG) measurement, as will be described in more detail below. The use of two or more antennas 42 offers a level of redundancy and enables detection of more eigenmodes, which can result in a more accurate RFMG measurement. Each antenna 42 may transmit and receive a frequency range of radio waves 43. In one embodiment, a first antenna 44 transmits a first range of radio waves 45, and the first antenna 44 receives the first range of radio waves 45; a second antenna 46 transmits a second range of radio waves 47, and the second antenna 46 receives the second range of radio waves 47. The antenna 42 may be fabricated from coax cable. In one embodiment, the antenna 42 is fabricated from a 0.250 inches outside diameter rigid stainless steel coax cable, having a stainless steel inner conductor and a Teflon insulator. The inner conductor can extend beyond the outer conductor and the insulator, and thus become an active radiating element of the antenna 42. The size of the antenna may depend on tank size. The antenna 42 may have any shape chosen by one with ordinary skill in the art. For some non-limiting examples, the antenna 42 can have a substantially circular or substantially rectangular shape.

With continuing reference to FIGS. 1 and 2, the first antenna 44 may have a substantially circular portion 48, according to one embodiment. The first antenna 44 may be positioned on the central tube 16 of the tank 10. In one embodiment, the substantially circular portion 48 may define a plane, in which a vector normal to the plane is positioned in the circumferential vector direction 32 of the cylindrical portion 30 of the tank 10. The second antenna 46 may have a substantially rectangular portion 49, according to one embodiment. The second antenna 46 may be positioned on the baffle plate 18 of the tank 10. The second antenna 46 may be electrically grounded to the baffle plate 18. In one embodiment, the substantially rectangular portion 49 may define a plane, in which a vector normal to the plane is positioned approximately 45° with respect to both the radial vector direction 31 and the circumferential vector direction 32 of the cylindrical portion 30 of the tank 10.

Figure 8:
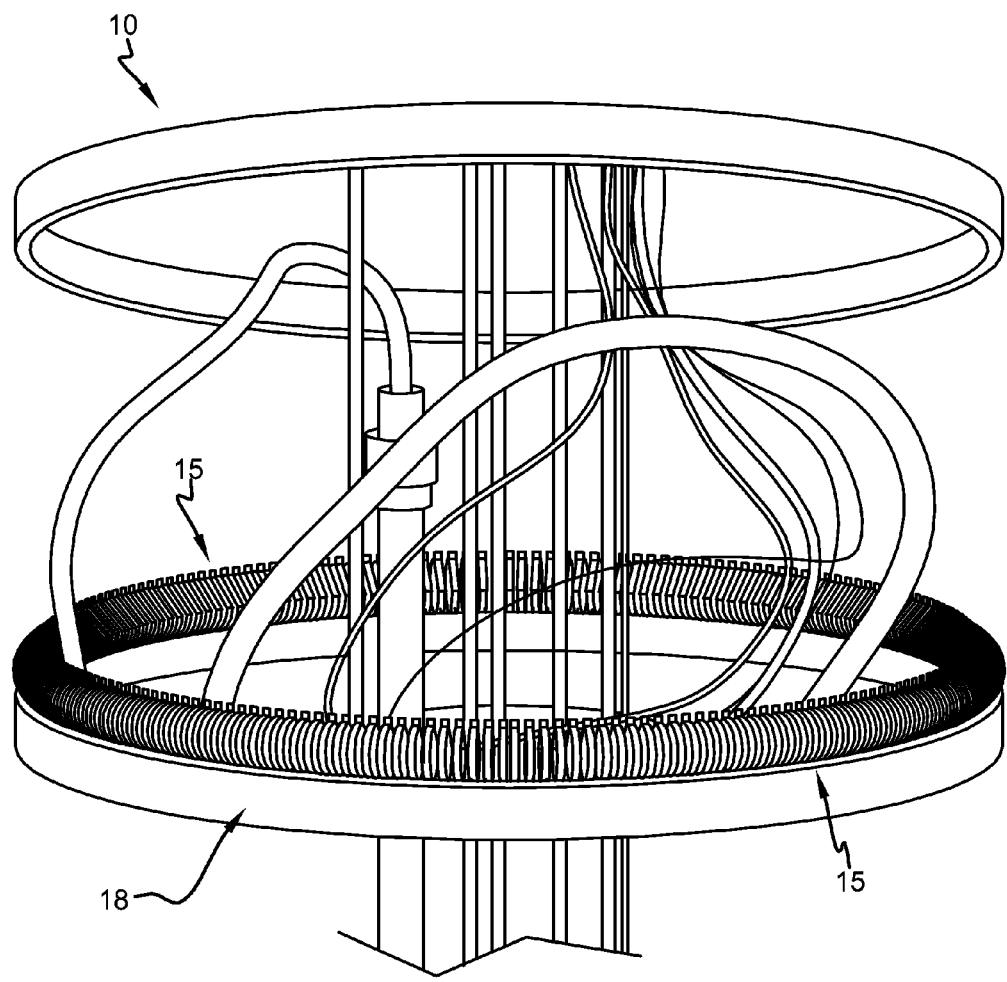
FIG. 8 is a perspective view of the top of the tank with the lid removed.

With reference to FIG. 1, the tank 10 will be described in detail according to one embodiment. The test tank used is a 58 cu. ft. volume stainless steel tank rated for use up to 250 psia. The tank shape is a 48 inch diameter cylindrical section 30 with elliptical ends, and a domed lid 14. A baffle plate 18 separated the domed lid 14 from the remainder of the tank and provided a clean hardware configuration for the RF modes. The upper dome section contained the wiring, tubing connections, and the section of a spray bar that was used to periodically cool the upper part of the tank. The spray bar was operated by running a pump, which was housed in the lower part of the tank inside a sump. During pump operation, liquid oxygen enters the pump inlet near the bottom of the tank and is sprayed through small holes in the upper end of the spray bar, located in the domed section. The pump is located in the sump enclosure, which was constructed of perforated stainless steel, having an array of ⅛" diameter holes. The sump, the baffle plate, and the central tube all had electromagnetic interference (EMI) fingers 15 along their perimeters, as shown in FIG. 8, to provide a good conduction path between these hardware elements and the tank walls for the RF mode surface currents. The baffle plate also had a 3" diameter screened hole, to aid in fluid/vapor exchange between the dome and tank, and also a 3" diameter hole to accommodate the later addition of mass gauge hardware. The central tube 16 contains the fill/drain line, a temperature diode rake, a spray bar tube, and a capacitance probe. A temperature diode located at the baffle plate position was used to define the liquid level at the 100% fill condition. The pump and spray bar provided additional cooling to the upper dome section, and was used on occasion to achieve a more uniform temperature distribution in the tank.

With reference to FIG. 2, a coax cable 80 connects the antenna 42 to an RFMG electronics unit 90. The coax cable 80 can be spaceflight-rated coax cable (manufactured by W. L. Gore and Associates), or Microcoax UFB211A coax cable, or any other cable chosen by one with ordinary skill in the art. The connection mechanism 82 between the coax cable 80 and the antenna 42 can be a subminature-A (SMA) connector, or a TNC connector, or any other connection means chosen by one with ordinary skill in the art. The RFMG electronics unit 90 may include an RF analyzer 92, an electronic data storage device 94, a direct current (DC) power supply 96, an RF switch 98, an RF directional coupler 100, a network interface 102 and a computer 110. In one embodiment, the RF analyzer 92 is a Rhode & Schwartz FSH-323 analyzer. An external computer 110 may connect to the RFMG electronics unit 90 via an Ethernet cable 104 to either the network interface 102 or the RFMG electronics unit computer 110. The external computer 110 may operate the RFMG electronics unit 90 remotely through the Ethernet connection.

Figure 3:
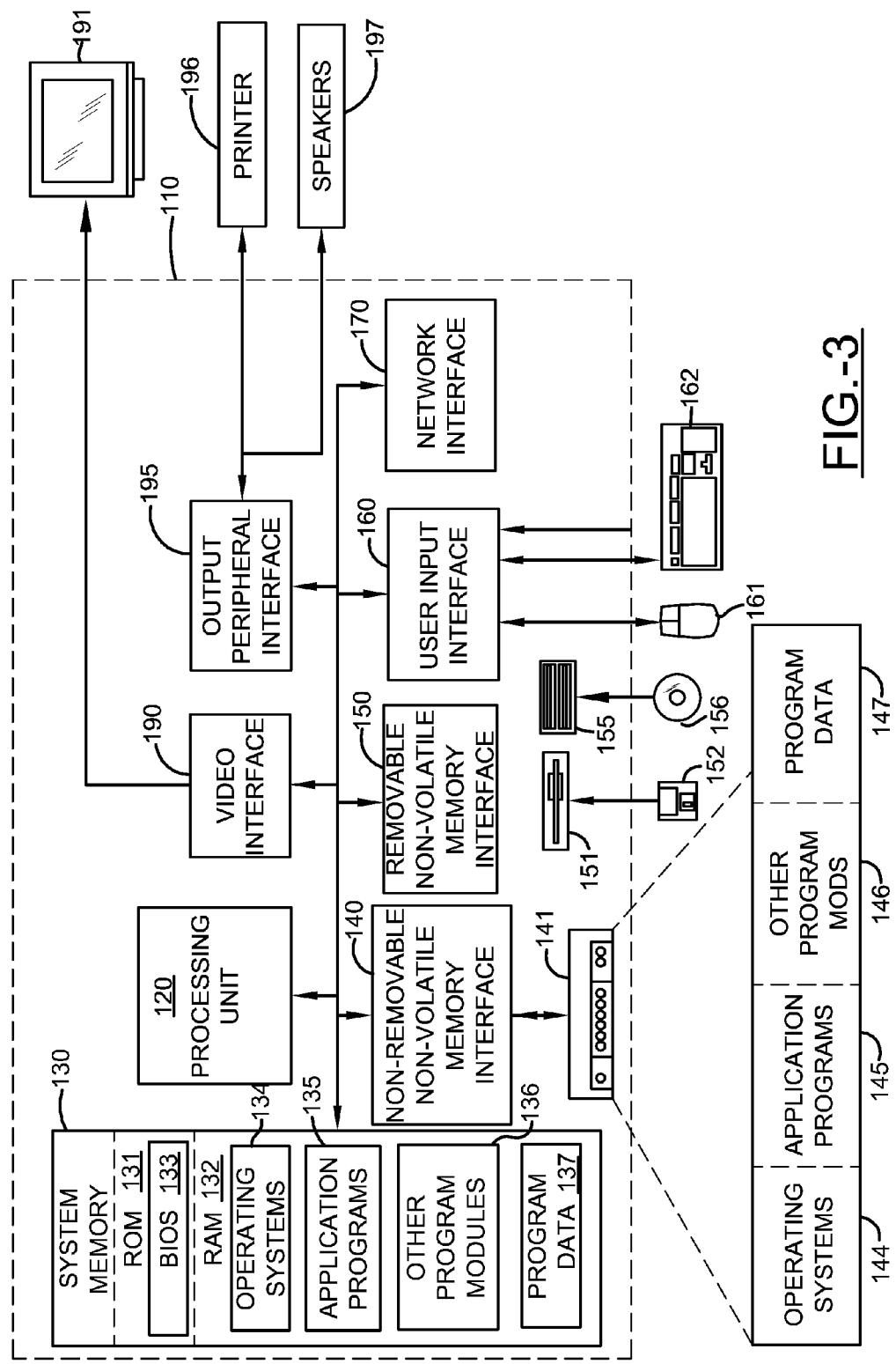
FIG. 3 is a diagram of a computer system.

With reference now to FIG. 3, a computer 110 may include, but is not limited to, a processing unit 120, a system memory 130, and a system bus 121 that couples various system components, including the system memory to the processing unit 120. The system bus 121 may be any of several types of bus structures using any of a variety of bus architectures, as is well known in the art. The system memory 130 includes computer storage media in the form of volatile and non-volatile memory such as read-only memory (ROM) 131 and random access memory (RAM) 132. The ROM 131 may include a basic input/output system (BIOS) 133. The RAM may include an operating system 134, application programs 135, other program modules 136, and program data 137. The computer 110 may include a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM, digital versatile disks (DVD), or other optical media. The computer 110 may also include magnetic tape cassettes, flash memory cards, digital versatile disks, digital video tape, solid state RAM, and solid state ROM.

With continuing reference to FIG. 3, the hard disk drive 141 is typically connected to the system bus 121 through a non-removable memory interface 140, and the magnetic disk drive 151 and optical disk drive 155 are typically connected to the system bus 121 by a removable memory interface 150. The hard disk drive 141 may store the operating system 144, application programs 145, other program modules 146, and program data 147. A user may enter commands and information into the computer 110 through input devices such as a keyboard 162 and pointing device 161, commonly referred to as a mouse, trackball, or touch pad. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via a video interface 190. A printer 196 or speakers 197 are connected to the system bus 121 via an output peripheral interface 195. The system bus 121 may include a network interface 170 for connecting to a computer network (not shown).

Figure 4:
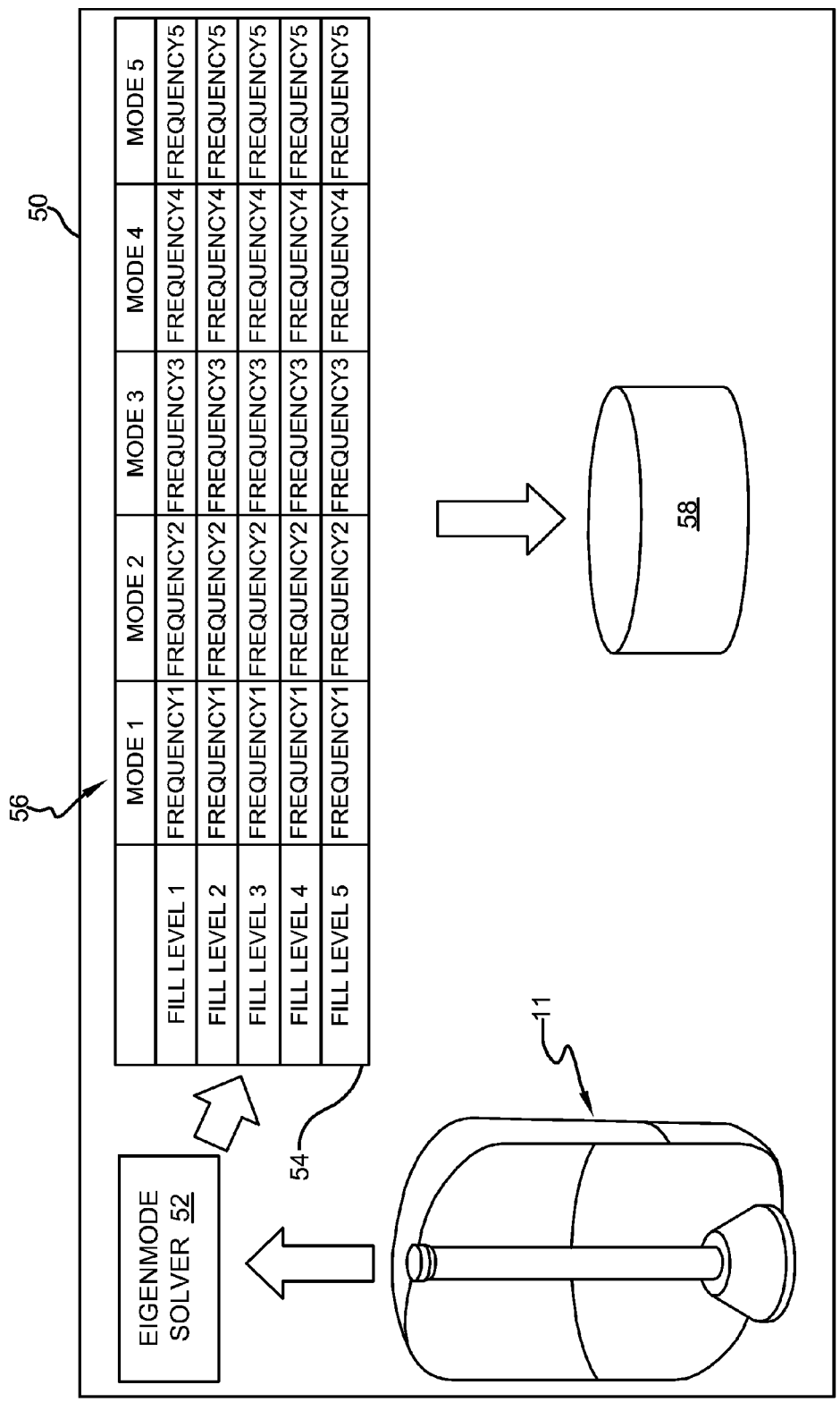
FIG. 4 is a diagram of a radio frequency measurement system including an eigenmode solver.

With reference now to FIG. 4, a radio frequency mass gauge (RFMG) measurement system 50 may include an eigenmode solver 52, which is used to determine the eigenmodes and eigenfrequencies of a computer model of the tank 11 shown in FIG. 1. The computer model of the tank 11 may be based on a computer aided design (CAD) model of the tank. The eigenmode solver 52 is a computer model, which solves for the resonant electromagnetic modes of a tank. The eigenmode solver 52 may solve for the resonant electromagnetic modes of a tank having simple or complex geometries. The eigenmode solver 52 may solve for the resonant electromagnetic modes of a tank, which is at least partially filled with a fluid having known or assigned values for dielectric constant, electrical conductivity, magnetic permeability, or index of refraction. Any of these known or assigned values may be inputs into the eigenmode solver 52. The eigenmode solver 52 may be a commercially available electromagnetic computer simulation software package including, but limited to, the COMSOL RF simulation package available from COMSOL AB (also known as COMSOL, Inc. with an office at 1 New England Executive Park, Suite 350, Burlington, Mass., 01803). The eigenmode solver 52 determines the eigenmodes and eigenfrequencies of the computer model of the tank 11 at various fill levels. The eigenmode solver 52 may simulate the eigenmodes and eigenfrequencies of fluid fill levels of the tank 10 from about 0% fill level (empty) to about 100% fill level (full) in about 1% increments.

With continuing reference to FIG. 4, the eigenmode solver 52 may simulate a set of electromagnetic eigenfrequencies 54 for each fluid fill level. Each fluid fill level may have multiple possibilities for the fluid configuration or distribution. In one embodiment, the fluid configuration or distribution is a normal settled liquid. In another embodiment, the fluid configuration or distribution is sloshing or splashing within the tank. Many other fluid configurations or distributions are possible. The eigenmode solver 52 may simulate a set of electromagnetic eigenfrequencies 54 for each fluid configuration or distribution at each fluid fill level. Each set of electromagnetic eigenfrequencies 54 may include any number of eigenmodes or eigenfrequencies chosen by one with ordinary skill in the art. For some non-limiting examples, the number of eigenmodes or modes can be 5, 10, 15, 20, 50, or 100. The eigenfrequencies in each simulated set of electromagnetic eigenfrequencies 54 can be broadened by a Gaussian function. In one embodiment, a plurality of sets of electromagnetic eigenfrequencies 56 includes one set of electromagnetic eigenfrequencies 54 for each fill level. In another embodiment, the plurality of sets of electromagnetic eigenfrequencies 56 includes one set of electromagnetic eigenfrequencies 54 for each fluid configuration at each fill level. The plurality of sets of electromagnetic eigenfrequencies 56 may be stored in a simulation matrix or database in an electronic data storage device 58, as is well known in the art.

Figure 5:
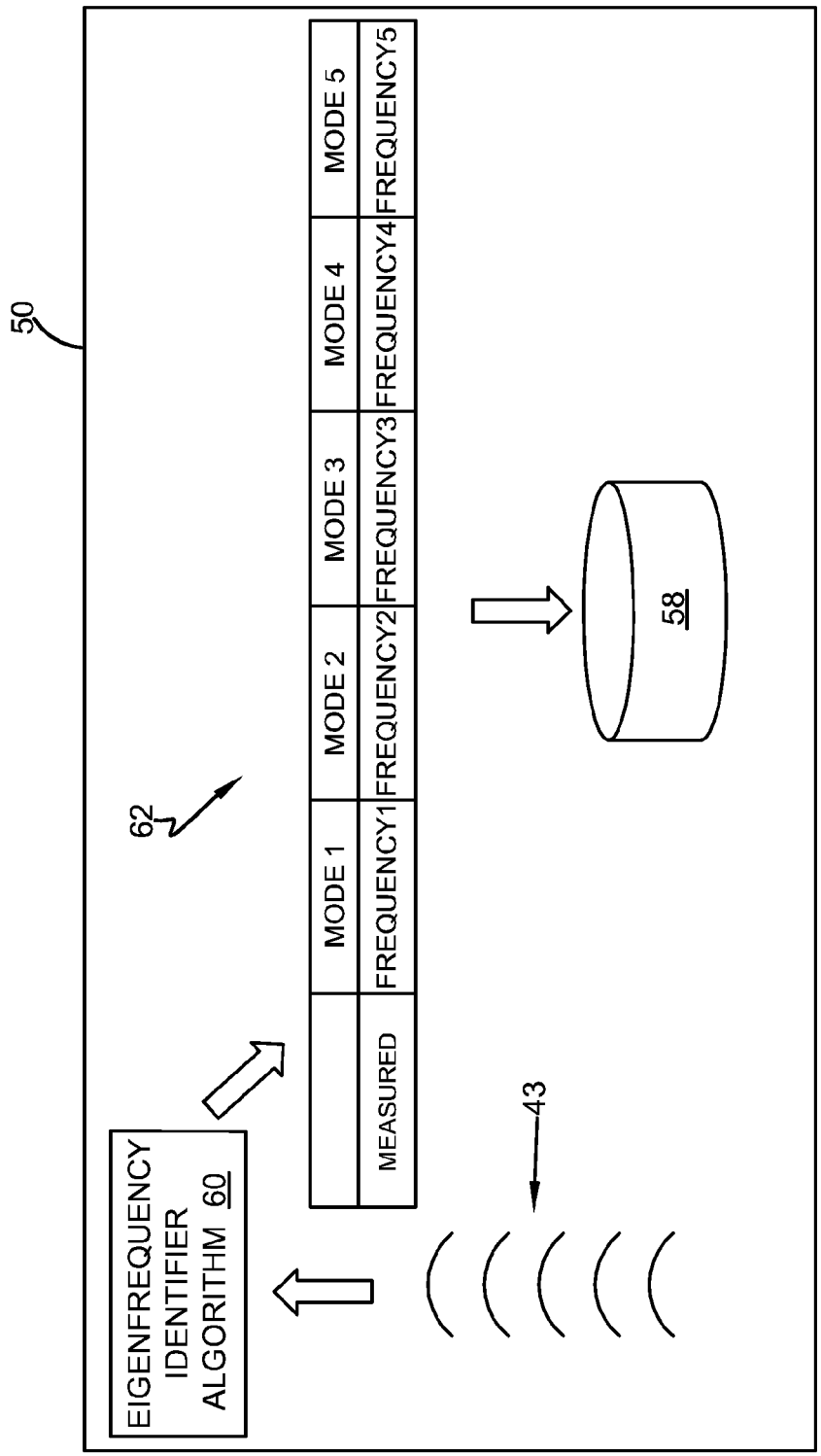
FIG. 5 is a diagram of a radio frequency measurement system including an eigenfrequency identifier algorithm.
Figure 6:
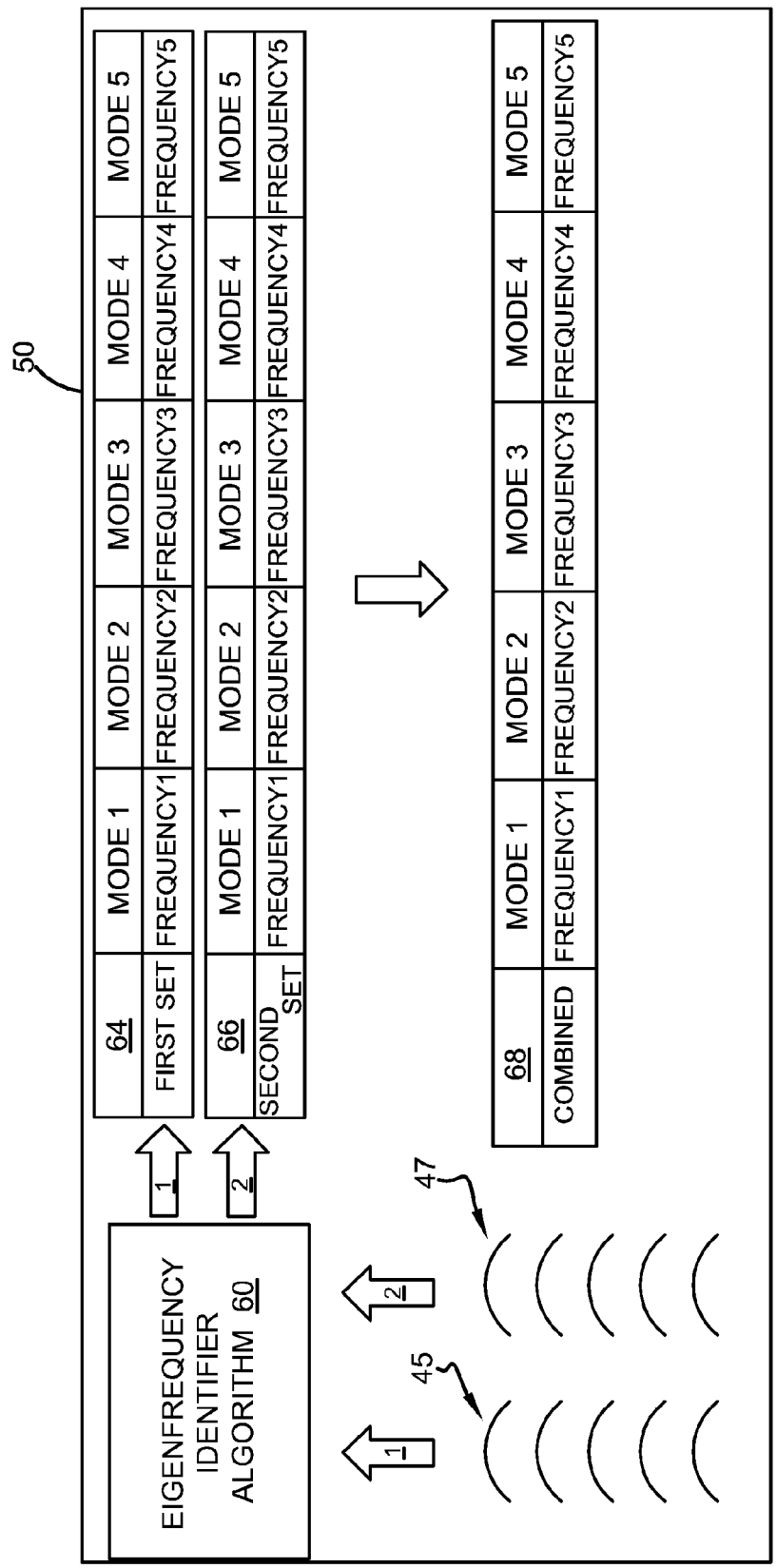
FIG. 6 is a diagram of a radio frequency measurement system including an eigenfrequency identifier algorithm.
Figure 7:
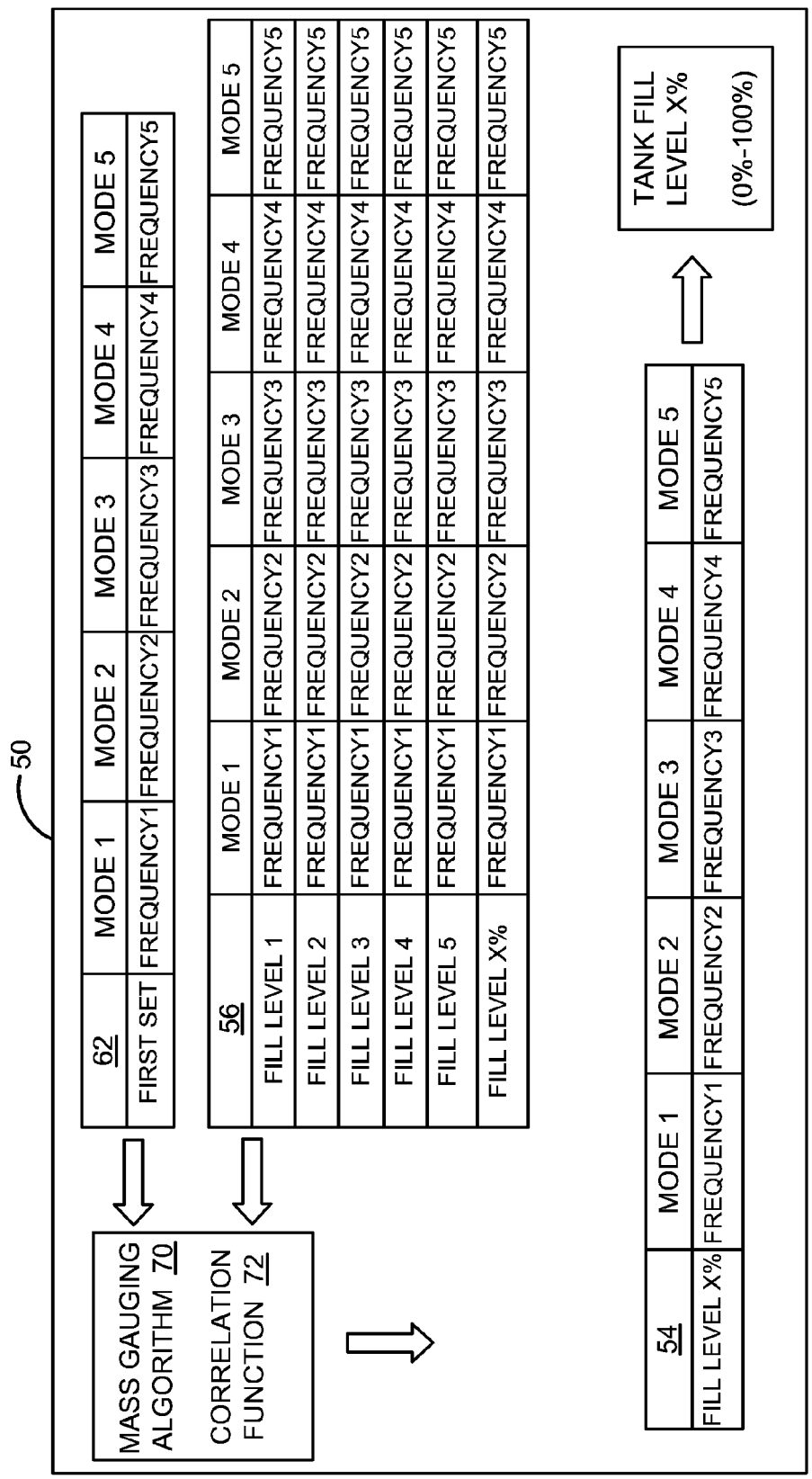
FIG. 7 is a diagram of a radio frequency measurement system including a mass gauging algorithm.
Figure 9:
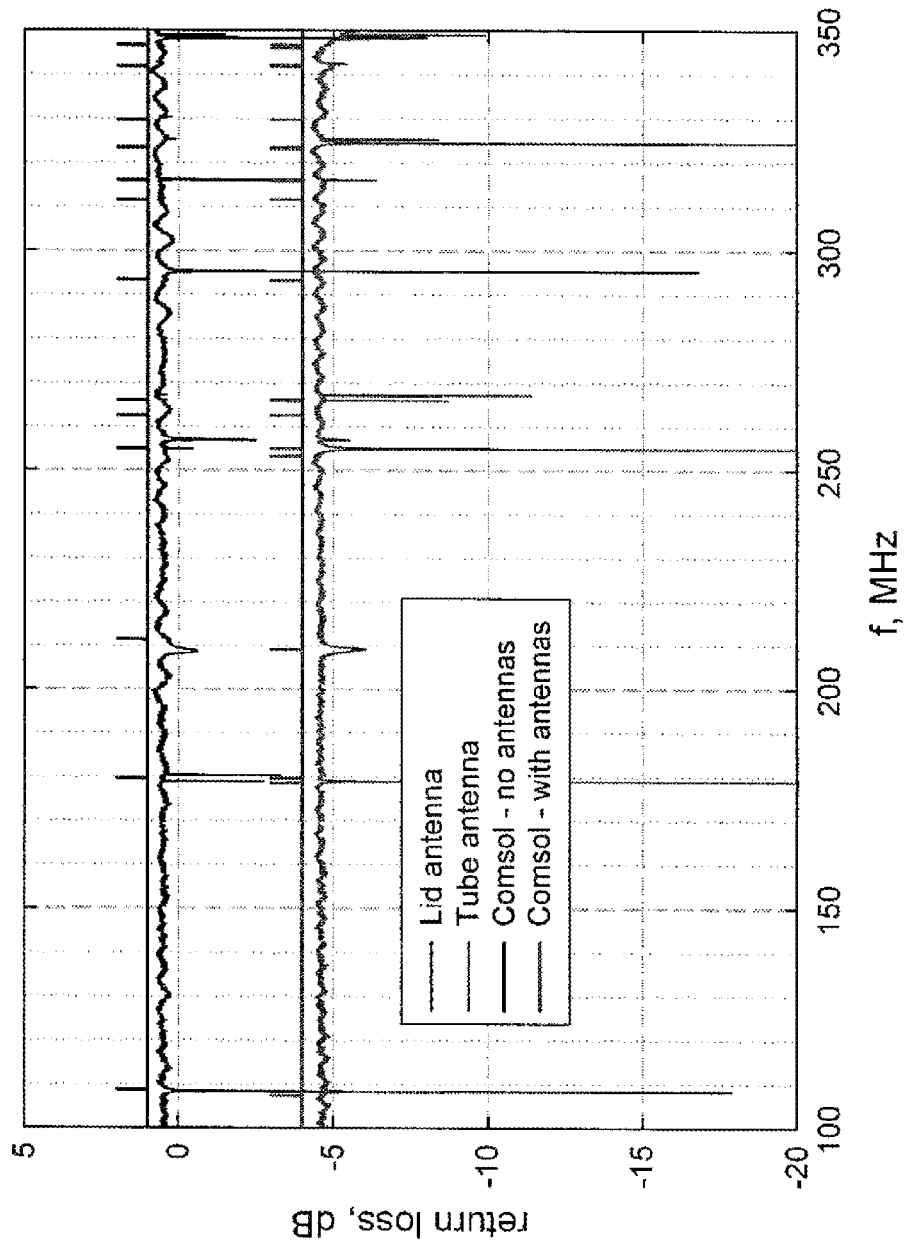
FIG. 9 is a graph of a return loss spectrum of tank using two antennas.

With reference now to FIGS. 5 and 6, the RFMG measurement system 50 may include an eigenfrequency identifier algorithm 60, which identifies a set of measured electromagnetic eigenfrequencies 62 in the frequency range of radio waves 43 received by the antenna 42. The eigenfrequency identifier algorithm 60 may include a peak detection algorithm for identifying the peaks in the received range of radio waves 43, or the return loss spectrum. For simplicity, the inverted peaks in the received range of radio waves 43, or the return loss spectrum, are referred to as peaks, as shown in FIG. 9. The eigenfrequencies in the measured set of eigenfrequencies 62 can be broadened by a Gaussian function, and in one embodiment, the eigenfrequencies are broadened by a 1 MHz Gaussian function. In one embodiment, the eigenfrequency identifier algorithm 60 identifies a first set of electromagnetic eigenfrequencies 64 in the first range of radio waves 45 received by the first antenna 44; and the eigenfrequency identifier algorithm 60 identifies a second set of electromagnetic eigenfrequencies 66 in the second range of radio waves 47 received by the second antenna 46. The first measured set of electromagnetic eigenfrequencies 64 and the second measured set of electromagnetic eigenfrequencies 66 are combined or merged into a combined measured set of electromagnetic eigenfrequencies 68. The measured set of eigenfrequencies 62 and the combined measured set of electromagnetic eigenfrequencies 68 may be stored in an electronic data storage device 58, as is well known in the art. With reference to FIG. 11, the simulated eigenmodes and the measure eigenmodes for several different fluid fill levels of the tank 11 are shown, according to one embodiment.

With reference now to all the FIGURES, the RFMG 50 operates by measuring the electromagnetic eigenfrequencies 62 of a tank 10, and then compares those frequencies to a previously calculated matrix or database of frequencies at different fill levels 56 to find the best match at some fill level. The RFMG measurement system 50 may include a matching algorithm or a mass gauging algorithm 70, which compares the measured set of eigenfrequencies 62, or the combined measured set of electromagnetic eigenfrequencies 68, to each simulated set of electromagnetic eigenfrequencies 54 in the plurality of simulated sets of eigenfrequencies 56. The mass gauging algorithm 70 accepts the set of measured eigenfrequencies 62, or the combined set of measured electromagnetic eigenfrequencies 68, and the plurality of sets of simulated eigenfrequencies 56 as inputs. The mass gauging algorithm 70 then selects one set of simulated eigenfrequencies 54 from the from the plurality of simulated sets of eigenfrequencies 56 based upon a match between the measured set of eigenfrequencies 62, or the combined measured set of electromagnetic eigenfrequencies 68, and a simulated set of eigenfrequencies 54. The mass gauging algorithm 70 then determines the fluid fill level of the tank 10 based upon the matched or selected set of simulated eigenfrequencies 54.

With continuing reference to all the FIGURES, the mass gauging algorithm 70 may include a correlation function 72:

$$g_m(\phi_j) = \int \Omega \cdot \eta \Psi_j df \qquad (1)$$

where the subscript m indicates the number of eigenmodes in the plurality of simulated sets of eigenfrequencies 56; $\phi_j$ is the simulated fill level of the tank ranging from about 0% to about 100%; $\Omega$ is an array that contains the set of measured eigenfrequencies 62 broadened by a Gaussian function; $\eta$ is a correction factor to account for the differences in eigenfrequencies between the actual tank 10 and the computer model of the tank 11; and $\psi_j$ is the plurality of simulated sets of simulated eigenfrequencies 56. A peak in the correlation function indicates a good match between the measured eigenfrequencies 62 and the simulated eigenfrequencies 54 for a specific fill level, as shown in FIGS. 10a, 10b, and 10c.

With continuing reference to all the FIGURES, the scaling of the tank eigenfrequencies with tank size and fluid index of refraction will now be discussed. Generally, the frequency of the lowest mode of a tank is given by the speed of light divided by a characteristic dimension of the tank. For tank with a characteristic size of 1 m, the lowest eigenfrequency is roughly 300 MHz. Adding dielectric fluid to the tank slows the speed of electromagnetic wave propagation, and the characteristic eigenfrequencies decrease. Completely filling a tank with a dielectric liquid (such as liquid oxygen) slows the speed of light everywhere in the tank to c/n, where c is the speed of light in vacuum and n is the index of refraction of the fluid at radio frequencies. The eigenfrequencies of the full tank $f_i^{full}$ are related to the empty tank eigenfrequencies $f_i^0$ by the expression:

$$f_i^{full} = f_i^0/n. \qquad (2)$$

From this expression (2), we find that the expected frequency shift of a mode between empty and full conditions is:

$$\Delta f_i^{0-full} = f_i^0(1-1/n). \qquad (3)$$

At intermediate fill levels, the frequency shift is not a linear interpolation of expression (3) and so it is necessary to use an eigenmode solver to calculate the eigenfrequencies at various fill levels and liquid orientations within the tank.

With continuing reference to all the FIGURES, the RF modes of a tank are excited by coupling an appropriate RF source signal to the tank using an antenna. In one embodiment, the RF electronics 90 measures the reflected RF power, which is a minimum at a tank resonance provided there is good antenna-tank coupling for that particular mode. When the antenna is excited at a frequency that does not correspond to a tank eigenfrequency, a small fraction of power is transmitted into the tank and instead the power is reflected back to the source, or the RFMG electronics unit 90. Although one antenna is all that is needed to perform a gauging measurement, the use of two antennas offers a level of redundancy and enables the detection of more modes, which may lead to more accuracy. The measurement frequency range of interest is governed by a lower and upper frequency. The lower frequency is generally determined by the lowest mode (i=1) frequency expected when the tank is full of liquid, $f_i^{full}$. The upper frequency may be determined as the frequency above which the mode density becomes too high to readily distinguish which peak in the measured spectrum corresponds to which mode from the simulations. As stated above, the inverted peaks in the return loss spectrum, or the received range of radio waves 43, are referred to as peaks.

With continuing reference to all the FIGURES, the RF power required to excite and detect the eigenmodes will now be discussed. In one embodiment, the RF power level used with the test tank 10 shown in FIG. 1 was 1 mW. The power per unit volume times the mode quality factor, Q, may be used to achieve similar values for the magnitude of the electric, or magnetic, field that exists in the tank. For the non-limiting example of the test tank 10, the quality factor Q of a typical mode with a good signature in the reflection spectrum (low reflection) is around 1,500 for an empty tank. Thus, the test tank 10 has the power density value of:

$$\frac{P_{RF} \cdot Q}{V_{TANK}} = \frac{1 \text{ mW} \cdot 1,500}{1.6 \text{ m}^3} \approx 1 \text{ W/m}^3 \qquad (4)$$

The empty tank quality factor is expected to scale as $Q=2V_{TANK}/(S\delta)$ where S is the surface area of the tank walls and $\delta$ is the skin depth. Other loss factors may affect the quality factor Q, such as absorption in the fluid. In the absence of other such loss factors, equation (4) proposes that the tank surface area and skin depth $\delta$ are the important scaling factors, in addition to the input power $P_{RF}$, for determining the characteristic field level within the tank.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A method for measuring the quantity of fluid in a tank comprising the steps of:
    simulating a plurality of sets of electromagnetic eigenfrequencies of the tank for a range of fill levels using an electromagnetic eigenmode solver algorithm, wherein each simulated set of electromagnetic eigenfrequencies represents a specific fill level within the tank;
    inputting the simulated plurality of sets of electromagnetic eigenfrequencies into a computer database;
    transmitting a first range of radio waves using a transmitting device located inside the tank;
    receiving the first range of radio waves using a receiving device located inside the tank;
    identifying a measured set of electromagnetic eigenfrequencies in the first range of radio waves using an eigenfrequency identifier algorithm;
    comparing the measured set of electromagnetic eigenfrequencies to the simulated plurality of sets of electromagnetic eigenfrequencies;
    selecting a match between the measured set of electromagnetic eigenfrequencies and the simulated plurality of sets of electromagnetic eigenfrequencies using a matching algorithm, wherein the match is one simulated set of electromagnetic eigenfrequencies from the simulated plurality of sets of electromagnetic eigenfrequencies;
    determining the fill level of the tank based upon the match.

2. The method of claim 1 wherein each simulated set of electromagnetic eigenfrequencies represents a specific fluid configuration at a specific fill level within the tank, and wherein the fluid has at least one fluid configuration at each specific fluid fill level of the tank.

3. The method of claim 1 wherein the tank further comprises a metal liner.

4. The method of claim 1 wherein the tank is formed of metal.

5. The method of claim 1 wherein before the step of transmitting a first range of radio waves, the method further comprises the step of:
    placing the tank in a low gravity environment.

6. The method of claim 1 wherein an antenna comprises the transmitting device.

7. The method of claim 1 wherein an antenna comprises the receiving device.

8. The method of claim 1 wherein the fluid is a dielectric fluid.

9. The method of claim 1 wherein the fluid is a cryogenic propellant.

10. The method of claim 1 wherein the eigenfrequency identifier algorithm includes a peak-detection algorithm for identifying the peaks in the first range of radio waves.

11. The method of claim 1 wherein a single antenna comprises the transmitting device and the receiving device.

12. The method of claim 1 wherein the matching algorithm includes a correlation function for determining the match between the measured set of electromagnetic eigenfrequencies and the one simulated set of electromagnetic eigenfrequencies.

13. The method of claim 1 wherein the range of fill levels is from about 0% to about 100%.

14. The method of claim 1 wherein the step of simulating a first set of electromagnetic eigenfrequencies further comprises simulating the first set of electromagnetic eigenfrequencies for the range of fill levels in about 1% increments.

15. A method for measuring the quantity of fluid in a tank comprising the steps of:
    simulating a plurality of sets of electromagnetic eigenfrequencies of the tank for a range of fill levels using an electromagnetic eigenmode solver algorithm, wherein each simulated set of electromagnetic eigenfrequencies represents a specific fill level within the tank;
    inputting the simulated plurality of sets of simulated electromagnetic eigenfrequencies into a computer database;
    transmitting a first range of radio waves using a first transmitting device located inside the tank;
    receiving the first range of radio waves using a first receiving device located inside the tank;
    identifying a first measured set of electromagnetic eigenfrequencies in the first range of radio waves using an eigenfrequency identifier algorithm;
    transmitting a second range of radio waves using a second transmitting device located inside the tank;
    receiving the second range of radio waves using the second receiving device located inside the tank;
    identifying a second measured set of electromagnetic eigenfrequencies in the second range of radio waves using an eigenfrequency identifier algorithm;
    combining the first measured set of electromagnetic eigenfrequencies with the second measured set of electromagnetic eigenfrequencies into a combined measured set of electromagnetic eigenfrequencies;
    comparing the combined measured set of electromagnetic eigenfrequencies to the simulated plurality of sets of electromagnetic eigenfrequencies;
    selecting a match between the combined measured set of electromagnetic eigenfrequencies and the simulated plurality of sets of electromagnetic eigenfrequencies using a matching algorithm, wherein the match is one simulated set from the simulated plurality of sets of electromagnetic eigenfrequencies;
    determining the fill level of the tank based upon the match.

16. The method of claim 15 wherein a first antenna comprises the first transmitting device and the first receiving device, and wherein a second antenna comprises the second transmitting device and the second receiving device.

17. The method of claim 15 wherein the step of simulating a plurality of sets of electromagnetic eigenfrequencies further comprises simulating the plurality of sets of electromagnetic eigenfrequencies for the range of fill levels from about 0% to about 100% in about 1% increments.

18. An apparatus for measuring a quantity of fluid comprising:
    a tank;
    a simulator device comprising an eigenmode solver computer algorithm for simulating a plurality of sets of electromagnetic eigenfrequencies of the tank for a range of fill levels, wherein each simulated set of electromagnetic eigenfrequencies represents a specific fill level within the tank;
    an electronic data storage device for storing the simulated plurality of sets of electromagnetic eigenfrequencies;
    a transmitter device located inside the tank for transmitting a first range of radio waves;
    a receiver device located inside the tank for receiving the first range of radio waves;

an identifier device comprising an eigenfrequency identifier computer algorithm for identifying a measured set of electromagnetic eigenfrequencies in the first range of radio waves;

a comparer device for comparing the measured set of electromagnetic eigenfrequencies to the simulated plurality of sets of electromagnetic eigenfrequencies;

a selector device for selecting a match between the measured set of electromagnetic eigenfrequencies and the simulated plurality of sets of electromagnetic eigenfrequencies using a matching computer algorithm, wherein the match is one simulated set from the simulated plurality of sets of electromagnetic eigenfrequencies; and a determiner device for determining the fill level of the tank based upon the match.

19. The method of claim 18 wherein the tank further comprises a metal liner.

20. The method of claim 18 wherein an antenna comprises the transmitting device and the receiving device.

* * * * *